No. 897,960. PATENTED SEPT. 8, 1908.
P. M. CAPITAINE.
ELECTRIC ARC LAMP.
APPLICATION FILED NOV. 11, 1907.

2 SHEETS—SHEET 1.

Witnesses.

Inventor.

No. 897,960.

P. M. CAPITAINE.
ELECTRIC ARC LAMP.
APPLICATION FILED NOV. 11, 1907.

PATENTED SEPT. 8, 1908.

2 SHEETS—SHEET 2.

Witnesses.

Inventor.

UNITED STATES PATENT OFFICE.

PIERRE MARIE CAPITAINE, OF LES LILAS, FRANCE.

ELECTRIC-ARC LAMP.

No. 897,960.      Specification of Letters Patent.      Patented Sept. 8, 1908.

Application filed November 11, 1907. Serial No. 401,696.

*To all whom it may concern:*

Be it known that I, PIERRE MARIE CAPITAINE, a citizen of the French Republic, and resident of Les Lilas, Seine, France, have invented new and useful Improvements in Electric-Arc Lamps, of which the following is a specification.

The present invention relates to an electric arc lamp, the regulating system of which possesses very great sensitivity securing a perfect driving forward of the carbons and regulating their position instantaneously as soon as it is necessary.

This lamp comprises, in principle, two wheels mounted on the same axis and having wound around their periphery in opposite directions the two threads supporting the carbon-holders and a beam oscillating on the same axis as the wheels and acted upon by two electrodes, the one of which is in series and the other in derivation. The beam carries a special type of brake which, according to the inclination of the beam, either leaves the axle of the wheels supporting the carbon-holders entirely free, so that the carbons can drive forward freely, or permits a slow driving forward of the carbons, the speed of the motion being moderated through the action of the brake, or, finally, to completely prevent the unwinding of the threads from the drums. The brake acts upon the axle of the drums through the intermediary of a reducing speed gear, which permits to exert with a feeble energy, an energetic braking action. The brake, preferably comprises a spur wheel which, according to the position of the beam, is in gear or not with a toothed wheel connected with the axle of the drums through the reducing speed gear. This spur wheel is rigidly connected with a paddle wheel which in revolving strikes with its wings against a body suspended on a flexible thread whereby the braking of the rotation of the paddle wheel is effected.

In the accompanying drawings the invention is illustrated by way of example only.

Figure 1:
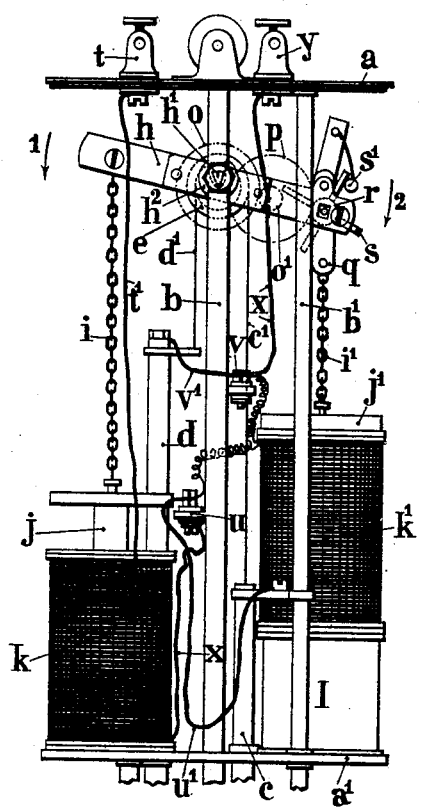
Figure 1:
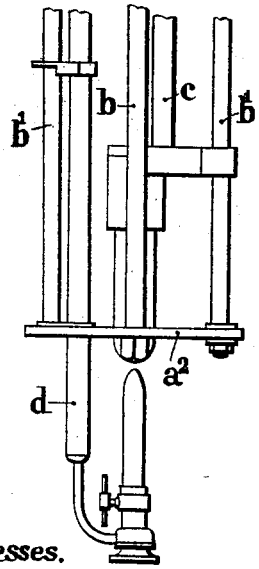
Figure 2:
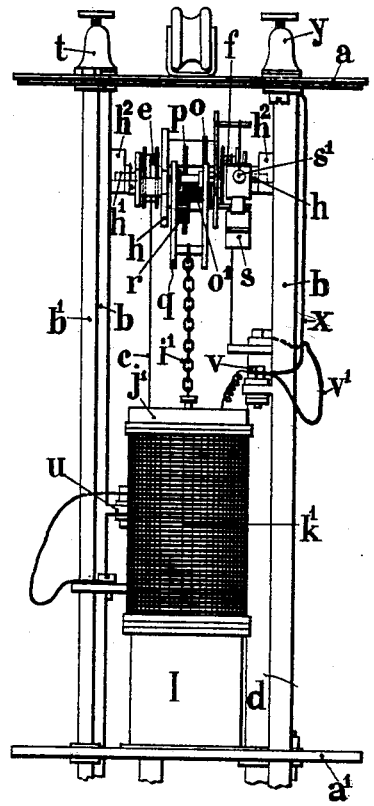
Figure 2:
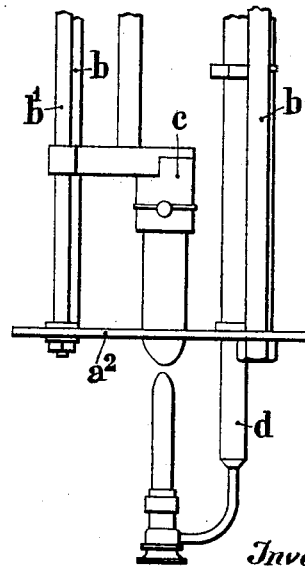
Figure 3:
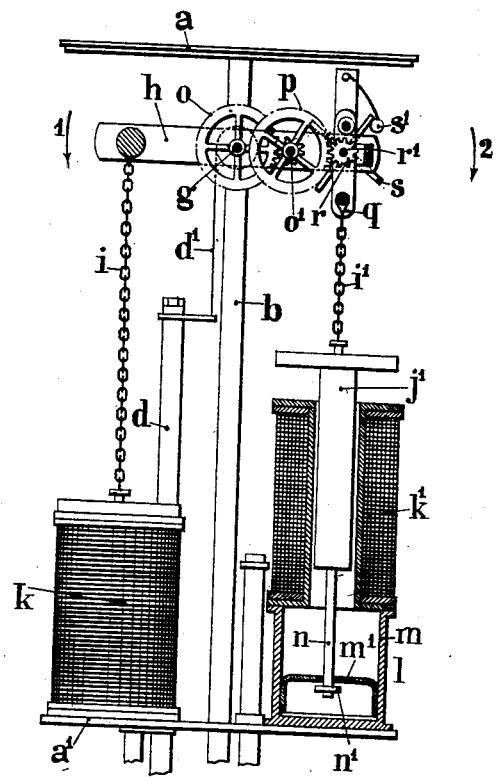
Figure 4:
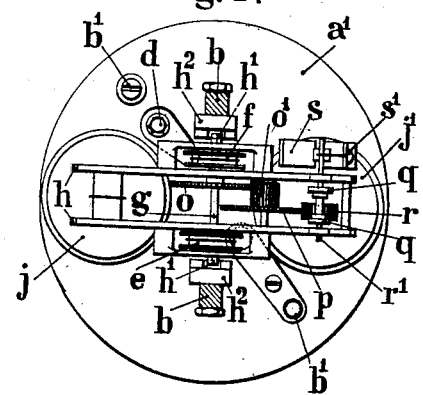

Figure 1 is a front view of the apparatus. Fig. 2 is a side view of the same. Fig. 3 is a similar view as that shown in Fig. 1, partly in section. Fig. 4 is a ground plan corresponding to Fig. 3.

As shown in the drawings, the lamp comprises a frame consisting of the plates $a$, $a^1$, $a^2$, of the vertical supports $b$ connecting said plates and of the guides $b^1$ for the carbon-holders. The upper carbon holder $c$ and the lower carbon holder $d$ are respectively suspended on the threads $c^1$ and $d^1$ which are wound in opposite directions on two drums $e$, $f$ keyed upon the axle $g$; this axle revolves freely on the two arms $h$ which form the beam. The beam is supported by two prisms $h^1$, which are mounted upon two supports $h^2$, rigidly connected with the vertical supports $b$. At the ends of the beam the cores $j$, $j^1$ of the two electro-magnets $k$ and $k^1$ are suspended on chains $i$, $i^1$. The positive electro-magnet $k$ is placed in series in the circuit and the negative electro-magnet $k^1$ is placed in derivation.

The core of the negative electro-magnet $k^1$ is connected with the piston of a special dash-pot $l$. This dash-pot consists of a cylinder $m$ in which moves the piston $m^1$ which is hollow; the rod $n$ of this piston is fixed to the core $j^1$ and is independent from the piston $m^1$, traversing without friction its top plate and adapted to act upon the piston through a disk $n^1$. It is evident that this dash-pot does not impede the motion of core $j^1$ as long as disk $n^1$ moves between the bottom of the cylinder and the top plate of the piston, but, when rod $n$ has been sufficiently lifted to bring disk $n^1$ in contact with the top plate of the piston and lifts the same, this disk acts like a valve and the air can only very slowly enter the piston whereby a resistance is created. When, after the piston has ascended in the cylinder, rod $n$ descends, it freely passes through the piston. A toothed wheel $o$ keyed upon axle $g$ is adapted to gear with a pinion $o^1$, which is rigidly connected with a wheel $p$. A bracket $q$ is provided at one end of the beam, to which the chain $i^1$ is attached; this bracket has a small pinion $r$, mounted on an axle $r^1$ which further serves as axle for a flying-pinion $s$; in proximity of the flying-wheel a ball $s^1$ is suspended. According to the position of beam $h$, the pinion $r$ is in gear with wheel $p$, as shown in Fig. 3, or separated from the same as per Fig. 1. The current arrives in the apparatus from terminal $t$, passing through wire $t^1$, traverses the positive electro-magnet $k$ and, through wire $x$ flows to a fixed terminal $u$ which through a flexible wire $u^1$ is connected with the upper part of the upper carbon-holder $c$. The current passes through the carbons to the lower carbon-holder, the bottom end of which is connected through a flexible wire $v^1$ with a fixed terminal $v$ which through wire $x$ is connected with the terminal $y$.

The negative electro-magnet is in derivation between the terminals $u$ and $v$, so that even when the current should for any reason whatsoever not pass through the carbons, it will pass through said electro-magnet.

The operation of the device is as follows:—When no current passes through the lamp, the beam inclines under the weight of the core of the negative electro-magnet, which is predominant and it assumes the position shown in Fig. 1. In this position, the inclination of the beam is such that pinion $r$ is out of gear with wheel $p$. Consequently the axle $g$ is made independent from the brake; it can freely turn under the action of the weight of the upper carbon-holder, which is the heavier of the two; this action brings the carbons together. If now current is sent into the lamp, it will, the several parts being in the position indicated, pass through the carbons and traverse the electro-magnet in series $k$; this electro-magnet attracts its core $j$ whereby the beam is inclined in the direction of the arrow 1 and pinion $r$ is brought into gear with wheel $p$. The pressure exerted upon said wheel through the tension of chain $i^1$, locks this wheel on its axle and prevents any rotation of axle $g$. The beam and the gearing act together as if there were only a beam to which the threads $c, c^1$ and the chains $i, i^1$ were attached. The inclination of the beam separates the carbons sufficiently to produce the arc. The distance between the points of the carbons is at this moment automatically regulated through the differential action of the two electro-magnets which have the tendency to make the beam assume the position of equilibrium corresponding to the quantities of current which pass in each electro-magnet.

When the points of the carbons have consumed and the carbons have to be moved forward, the current passing in the electro-magnet in series, diminishes and the action of the electro-magnet in derivation becomes predominant; the beam oscillates in the direction of arrow 2 in lowering the pinion $r$. Hereby the pressure of the pinion of wheel $p$ is reduced, the pinion remaining however in gear with the wheel under the action of the weight of the upper carbon-holder. The axle can revolve and the threads $c^1, d^1$ can unwind, whereby the carbons are moved forward. The axle $g$, in revolving, takes along the wheels $o, o^1$; pinion $r$ being in gear with wheel $p$, the flying-pinion $s$, which is rigidly connected with pinion $r$, is forced to revolve; its wings strike against the ball $s^1$ whereby a resistance is effected and the rotation of axle $g$ is braked so that the carbons move slowly. When this motion is no longer sufficient, the beam inclines farther in the direction of the arrow 2 and, the contact between wheel $p$ and pinion $r$ ceasing, wheel $p$ is set free the carbons now can rapidly move forward, as there is nothing to prevent the quick unwinding of the threads $c^1, d^1$.

It is evident that the moving forward of the carbons will be effected under any circumstances and that, according to requirement, the moving forward can be quick or slackened through the action of the brake. At the moment when the axle of the drums is free, no resistance prevents its rotation. Consequently, the weight of the upper carbon-holder is always sufficient for securing the moving forward of the carbons. It is further evident that, owing to the multiplication of the wheels $r, p, o, o^1$ a feeble effort of the electro-magnet $k^1$ is sufficient to produce an energetic braking of axle $g$. The dashpot prevents the sudden attraction of the core of the positive electro-magnet at the moment when the current is sent into the lamp. On the other hand, this dash-pot does not in the least oppose the motions caused through the negative electro-magnet. Finally, the play of rod $n$ of the dash-pot in the piston $m^1$ permits for a certain length of the rod, the displacements of the same without resistance in both directions, it gives a great independency to the beam at the moment when the position of said beam is regulated and consequently when the positions of the carbons are regulated. At the moment when the beam is nearly horizontal (Fig. 3), axle $g$ is locked with the brake and the disk $n^1$ is slightly below the piston $m^1$ and ready to lift this piston when the beam should incline in the direction of the arrow 1. In this position the mechanism operates with great sensibility.

The special braking device composed of pinion $r$ and wheel $s$ has a double advantage; owing to the brake being coupled through the meshing of toothed gearings, in a certain position of the beam, a sliding of the parts upon one another is absolutely prevented, which could not be obtained through other means, or through friction coupling. The slackening caused through the shocks of ball $s^1$ on the wings of the flying-wheel $s$ is sufficiently important to obtain through a feeble multiplication between the axle $g$ and the wheel $s$, a notable speed reducing.

The arrangement of the several parts are described and shown by way of example, the shape, dimensions and constructional details to be modified according to requirements without departing from the idea of the invention.

What I claim as my invention and desire to secure by Letters Patent is:—

In an electric arc lamp in combination with the two carbon-holders suspended to threads wound upon drums mounted upon the same axle, with a beam to the ends of which the chains for the cores of the electro-magnets are attached, one of which is in derivation and the other in series, a braking device comprising in combination a pinion and a flying-pinion, a heavy body suspended in proximity of the flying pinion, so that its wings are adapted to strike against said body, an axle for the pinion and the flying pinion mounted at one end of the beam, a speed reducing gearing connecting said braking device with the axle of the drums for the carbon-holders, a spur wheel between the pinion of the braking device and the speed reducing gearing, and a dash-pot connected with the core of the negative electro-magnet, having a hollow piston a cylinder for said piston, a piston rod which freely passes through the top plate of said hollow piston, a disk at the end of the piston for lifting the piston when the rod is in a certain position, substantially as described and shown and for the purpose set forth.

In witness whereof I have hereunto set my hand in the presence of two subscribing witnesses.

PIERRE MARIE CAPITAINE.

Witnesses:
W. F. FALLAMY,
DEAN B. MASON.